United States Patent [19]
Rubin

[11] 3,929,151
[45] Dec. 30, 1975

[54] MIXING APPARATUS

[76] Inventor: Harry S. Rubin, 7847 Williams Ave., Philadelphia, Pa. 19150

[22] Filed: Mar. 6, 1974

[21] Appl. No.: 448,778

[52] U.S. Cl............. 137/268; 23/267 E; 23/272.7; 23/272.8
[51] Int. Cl.² ..................... B01D 11/00; B01F 1/00
[58] Field of Search ... 137/268, 101.11, 117, 205.5, 137/610, 609, 612; 239/318, 367; 138/44, 45, 46; 23/267 E, 272.7, 272.8; 251/298, 299, 301

[56] References Cited
UNITED STATES PATENTS

| | | | |
|---|---|---|---|
| 423,773 | 3/1890 | Jewell | 23/272.7 |
| 452,172 | 5/1891 | West | 23/272.7 |
| 846,100 | 3/1907 | Estep | 137/268 UX |
| 885,369 | 4/1908 | Packard et al. | 137/268 X |
| 1,549,764 | 8/1925 | Griffith | 251/284 |
| 2,578,076 | 12/1951 | Kirby | 251/284 X |
| 2,703,176 | 3/1955 | Shuldener | 137/268 |
| 2,885,271 | 5/1959 | Kersh | 137/268 X |
| 3,170,481 | 2/1965 | Presnell | 137/504 X |
| 3,319,648 | 5/1967 | Donner | 137/504 |
| 3,323,539 | 1/1967 | Schneider, Jr. et al. | 137/268 |
| 3,416,897 | 12/1968 | Long et al. | 23/272.7 X |
| 3,474,817 | 10/1969 | Bates et al. | 137/268 |
| 3,612,080 | 10/1971 | Schneider, Jr. | 137/268 X |
| 3,620,228 | 11/1971 | Schmid | 137/519.5 X |
| 3,710,817 | 1/1973 | Lorenzen | 137/268 |
| 3,726,304 | 4/1973 | Cook | 137/268 |
| 3,756,272 | 9/1973 | Hammond | 137/498 |

Primary Examiner—Martin P. Schwadron
Assistant Examiner—Robert I. Miller
Attorney, Agent, or Firm—Seidel, Gonda & Goldhammer

[57] ABSTRACT

Apparatus having parallel flow paths between a single inlet and a single outlet for adding an ingredient to one flow path is disclosed. Valve means is provided to selectively control the rate of flow through said one path; which rate is varied in response to the line pressure in said other path.

18 Claims, 8 Drawing Figures

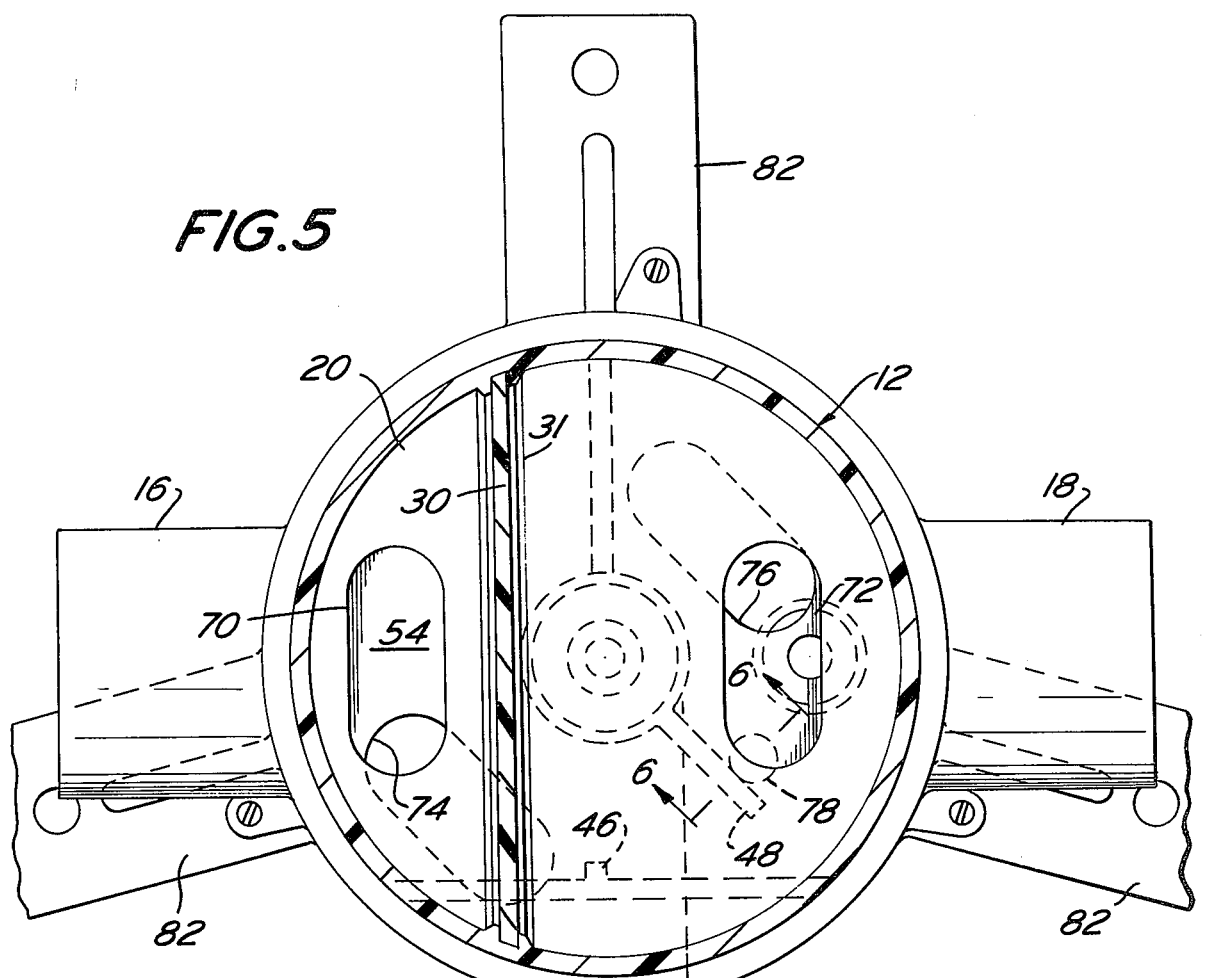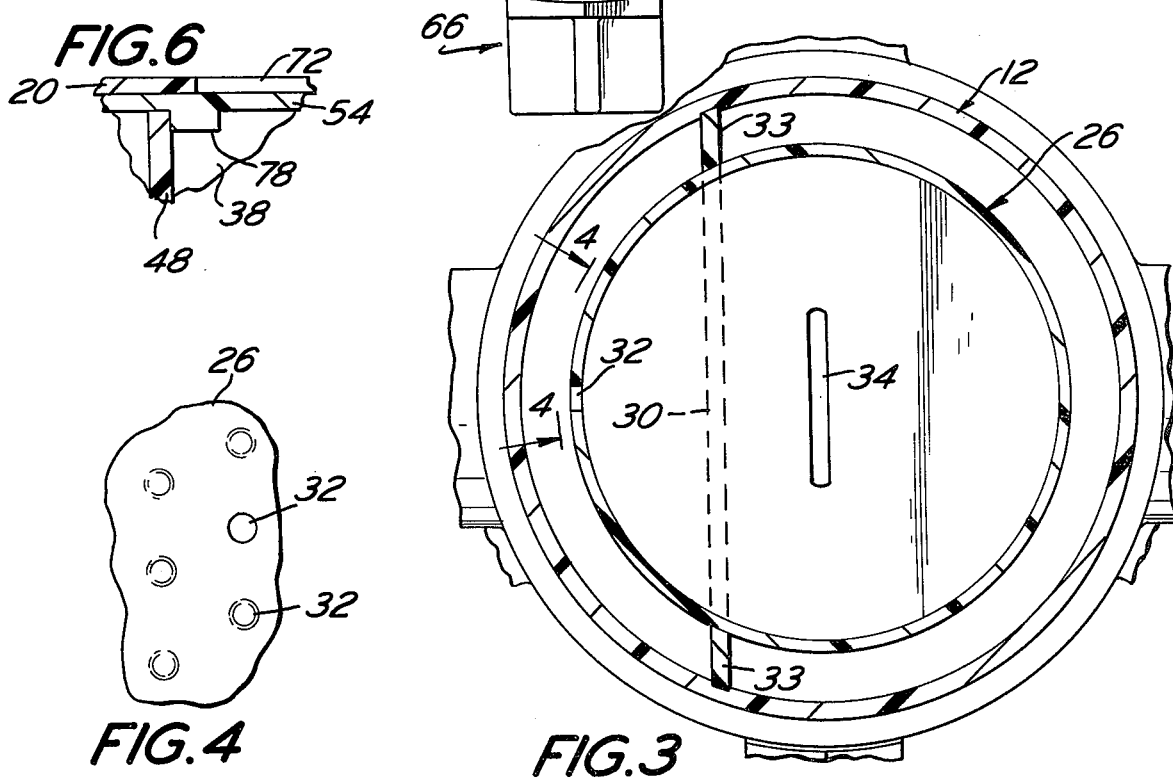

MIXING APPARATUS

This invention relates to an improvement in a mixing apparatus, particularly an apparatus of the type adapted to selectively add ingredients to a liquid flow in a controlled manner. Apparatus of the general type disclosed herein is known. For example, see U.S. Pat. No. 3,202,164.

The apparatus of the present invention is adapted to facilitate the mixing of an ingredient such as a salt of chlorine or fluorine to water. The salt may be in the form of tablets, granules, powder or the like. Apparatus of this nature has general use in connection with controlling the chlorine or fluorine content of swimming pools, municipal reservoirs, etc.

The apparatus of the present invention includes a housing constructed and arranged so as to have parallel flow paths between an inlet and an outlet. One path is by way of a main chamber. The other flow path communicates with opposite ends of the main chamber by means of a secondary chamber with a selective adjustable valve means therebetween. The valve means includes one limit stop for a movable flow, restrictor responsive to the pressure in the main chamber. An ingredient is added to the water as it flows through the secondary chamber.

When there is no flow through the main chamber of the apparatus of the present invention, the secondary chamber drains into the main chamber which in turn drains to the exterior to prevent the concentrated liquid from flowing into the outlet. Since the addition of a chlorine salt has the tendency of rendering the water acidic, the apparatus may include means for adding a base to the stream adjacent the outlet of the housing for rendering the pH neutral.

It is an object of the present invention to provide a mixing apparatus for adding an ingredient to one portion of a liquid stream.

It is another object of the present invention to provide apparatus for mixing a chemical salt with a first portion of a liquid stream in a controlled manner so that the rate of flow in said first portion is responsive to the pressure of the main stream.

It is another object of the present invention to provide a correlated mixing apparatus wherein selective manual adjustment of valve means for separating a liquid stream into two paths automatically adjusts the range of movement of a flow restrictor in one of the flow paths.

Other objects will appear hereinafter.

For the purpose of illustrating the invention, there is shown in the drawings a form which is presently preferred; it being understood, however, that this invention is not limited to the precise arrangements and instrumentalities shown.

FIG. 3 is a sectional view taken along the line 3—3 in FIG. 2.

FIG. 4 is an elevation view taken along the line 4—4 in FIG. 3.

FIG. 5 is a sectional view taken along the line 5—5 in FIG. 2.

FIG. 6 is a sectional view taken along the line 6—6 in FIG. 5.

FIG. 7 is a sectional view taken along the line 7—7 in FIG. 2.

FIG. 8 is a sectional view taken along the line 8—8 in FIG. 2.

Referring to the drawing in detail, wherein like numerals indicate like elements, there is shown in FIG. 1 mixing apparatus in accordance with the present invention designated generally as 10.

Figure 1:
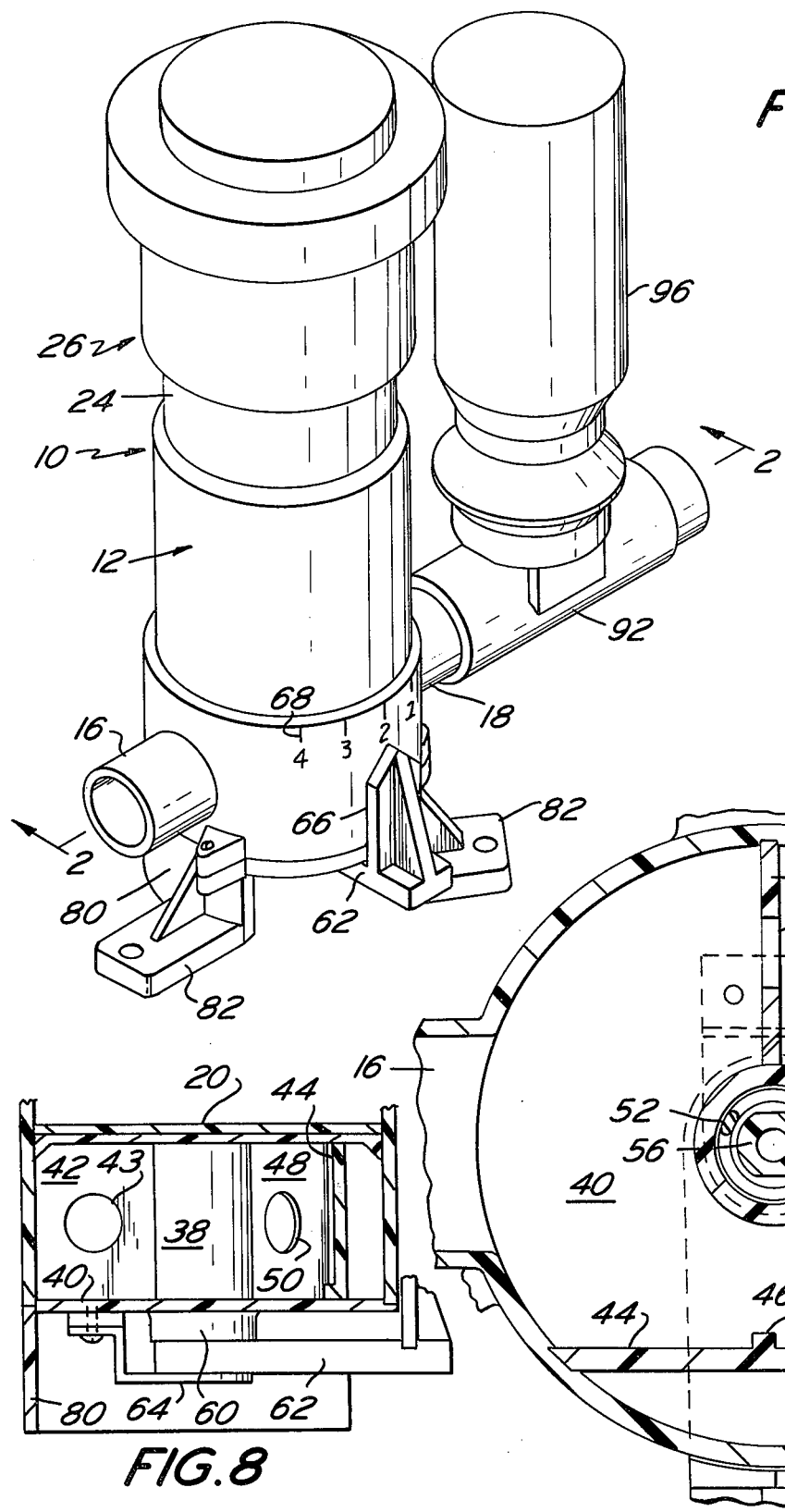
FIG. 1 is a perspective view of apparatus in accordance with the present invention.

The apparatus 10 includes a housing 12 which in the illustrated embodiment is cylindrical in cross-section. The housing 12 is preferably made from a material which is inert with respect to the ingredients to be added to a flow stream. Thus, in connection with a mixing apparatus wherein the ingredients to be added are chlorine or fluorine salts, the housing 12 may be made from polymeric plastics such as nylon, acrylics, polypropylene, polyvinylchloride, and the like.

The housing 12 includes a main chamber 14 extending between an inlet 16 and an outlet 18. See FIG. 2. A wall 20 defines the upper end of the main chamber 14 and separates the main chamber 14 from a secondary chamber 22 thereabove.

The upper end of the housing 12 is open and may include a reduced diameter portion 24 adapted to receive a portion of a dispensing canister 26. The canister 26 is removably secured to the housing 12 in any convenient manner such as by threads 28 on the ID of portion 24 engaged with threads on the OD of a reduced diameter portion of the canister 26. A liquid tight seal is attained in any convenient manner such as by a rubber O-ring 29 between the end face of the portion 24 and a juxtaposed shoulder on the canister 26.

An upright partition 30 is provided within the chamber 22 and supported at its lower end by a channel member 31 on the upper surface of wall 20. Due to the difference in the OD of the canister 26 and the ID of the housing 12, the partition 30 is provided with upright legs 33 which cooperate with the outer periphery of the canister 26. See FIG. 3. Thus, the partition 30 cooperates with the bottom wall and periphery of the canister 26 to divide the chamber 22 into an inlet portion and an outlet portion.

The canister 26, at the inlet portion of chamber 22, is provided with knockouts to define openings 32. The knockouts may be pushed inwardly with any sharp instrument. In this manner, water in the inlet portion of chamber 22 may flow into the canister 26 for contact with the ingredient 36 such as a chlorine salt in the form of granules. On the opposite side of the partition 30, namely the outlet portion of chamber 22, the bottom wall of canister 26 is provided with an enlarged opening 34. Opening 34 was defined by a knockout in a similar manner as described above.

Figure 2:
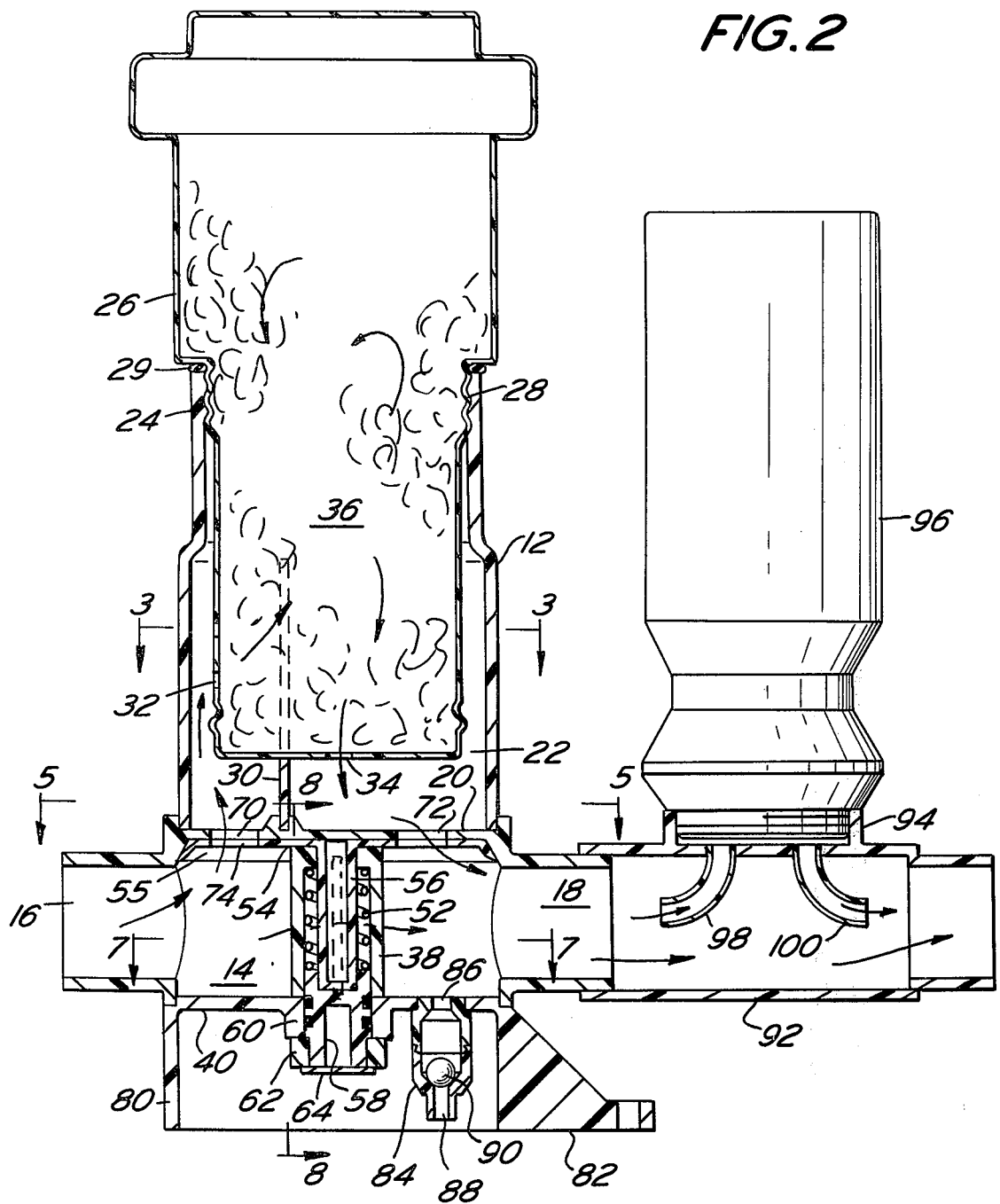
FIG. 2 is a sectional view taken along the line 2—2 in FIG. 1.

Referring to FIGS. 2 and 7, there is provided a hollow cylindrical hub 38 within the main chamber 14. Hub 38 extends upwardly from the bottom wall 40 of the main chamber 14. A stationary wall 42 extends from the housing 12 to the hub 38. Wall 42 may be provided with a bleed 43 therein. A stationary wall 44 is secured to the inner periphery of the housing 12 and is generally perpendicular to the wall 42 which in turn is generally perpendicular to the axes of the inlet and outlet 16, 18 respectively. Wall 44 is provided with a limit stop 46 generally in line with the wall 42.

A flow restrictor 48 is secured to the hub 38. The restrictor 48 may have a bleed 50 therethrough. Limit stop 46 limits the movement of the flow restrictor 48 in a clockwise direction in FIG. 6.

A spring 52 is disposed between the ID of the hub 38 and the OD of a core 56. Core 56 depends from and is connected to a valve member 54. Valve member 54 is planar and juxtaposed to the wall 20. Valve member 54, when made of a polymeric plastic, may be provided with a flexible lip 55 which is flexed by line pressure against the housing 12 to attain a seal. The height and width of flow restrictor 48 is adapted to occupy the space between wall 40, valve member 54, hub 38 and the wall 44.

Referring to FIG. 2, the lower end of the core 56 is secured to a journal 58 in any convenient manner. The journal 58 is provided with O-ring seals and rotatably supported by a boss 60 on the bottom wall 40 of the housing 12. Spring 52 is preferably a torsion spring having one end connected to the hub 38 and its other end connected to the journal 58 whereby the spring 52 tends to bias the flow restrictor 48 in a clockwise direction in FIG. 7 toward the limit stop 46.

An actuator arm 62 is fixably secured to the journal 58 in any convenient manner and held thereon by a retainer 64. See FIGS. 2 and 8. The actuator arm 62 terminates in an indicator 66 juxtaposed to the outer periphery of the housing 12. See FIG. 1. The outer periphery of housing 12 is provided with indicia 68. As the actuator arm 62 is rotated about the longitudinal axis of journal 58, it rotates the valve member 54 about said axis.

The stationary wall 20 has an opening 70 on one side of the partition 30 and an opening 72 on the other side of the partition 30. See FIG. 5. Thus, opening 70 provides communication between the main chamber 14 and the inlet portion of chamber 22. Likewise, opening 72 provides communication between the outlet portion of chamber 22 and the main chamber 14. In view of the location of the partition 30, the outlet portion of the secondary chamber 22 is larger than the inlet portion thereof.

The valve member 54 is provided with an opening 74. Depending upon the rotative position of the valve member 54, opening 74 will be partially or wholly aligned with the opening 70. Valve member 54 is provided with a second opening 76 which is diametrically opposite the opening 74. Opening 76 is adapted to be partially or wholly aligned with the opening 72 depending upon the rotative position of valve member 54. Each of the openings 70–76 is elongated as shown more clearly in FIG. 5.

Referring to FIGS. 5 and 6, a limit stop 78 is provided on the lower surface of the valve member 54. Limit stop 78 is adapted to be contacted by the flow restrictor 48 and thereby limit the maximum open position of the flow restrictor 48. As the valve member 54 rotate, due to manual rotation of arm 62, the location of the limit stop 78 changes. Rotation of limit stop 78 in a clockwise direction in FIG. 5 results in a larger overlap of opening 70 with opening 74 and of opening 72 with opening 76.

The housing 12 is provided with an arcuate extension 80. Extension 80 corresponds to approximately 270° of the periphery of housing 12. The cutout portion of the extension 80 facilitates rotation of arm 62 in the gap between the ends of the extension 80. Extension 80 is provided with any required number of mounting brackets. Three such mounting brackets designated as 82 are illustrated in the drawings. Each mounting bracket 82 has a hole therein to facilitate bolting the apparatus 10 to a convenient supporting surface.

In the event that flow is shut off, any water in the outlet portion of chamber 22 is highly concentrated with an ingredient such as chlorine. If this highly concentrated water is permitted to be transmitted to a swimming pool made of a polymeric plastic, it may stain the same. Accordingly, the apparatus 10 is provided with a drain valve. See FIG. 2. It will be noted that the bottom wall 40 in the main chamber 14 is lower than the inlet and outlet. Adjacent the outlet 18, the wall 40 is provided with a hole in which is fixably mounted a drain valve having a housing 84. The housing 84 is hollow and has an inlet 86, and an outlet 88. A ball valve member 90 is disposed within the housing 84. The specific gravity of ball valve member 90 is less than the specific gravity of water. When water is flowing through the apparatus 10, the pressure of the water is greater than the forces of buoyancy and maintains the ball valve member 90 in the position shown in FIG. 2 where it prevents flow through the outlet 88. When the water is shut off, the ball valve member 90 rises so that concentrated water from the outlet portion of chamber 22 may be drained from the main chamber 14 through the outlet 88.

If desired, an adapter 92 may be attached to the outlet 18. Adapter 92 may be a hollow tubular member telescoped over the outlet 18 and having a boss 94 threaded on its inner periphery. A container 96 having therewithin a base is threadedly coupled at its open end to the threads on the inner periphery of the boss 94. Part of the flow stream is diverted into the container 96 by way of inlet 98 and discharges from the container 96 back into the adapter 92 by way of outlet 100. Flow through the adapter has a suction effect on the outlet 100. The base inlet container 96 is adapted to neutralize the pH of the water flowing through the adapter 92.

In view of the above description, a detailed explanation of operation is not deemed necessary. Thus, the following summary is deemed to be sufficient.

The setting of pointer 66 with respect to the indicia 68 depends on a variety of factors such as the size of the pool, the flow rate, etc. The best setting of pointer 66 may be ascertained on a trial and error basis whereby the user checks the parts per million of chlorine in the pool in a conventional manner. The desired chlorination varies with the area in which the pool is located, the amount of sun, the number of people in the pool, etc.

When the arm 62 is rotated to a position wherein the indicator 66 is juxtaposed to one of the indicia 68, one surface of the flow restrictor 48 abuts the limit stop 46 and the opposite surface abuts the limit stop 78. In this position of the arm 62, there is a maximum alignment between openings 70 and 74 and openings 72 and 76. The flow restrictor 48 is biased into contact with the limit stop 46 by spring 52. For superchlorination of the pool, it is recommended that the arm 62 be located in this position for 1 day a week. This will eliminate the need for manually adding chlorine to the pool once a week.

If wall 42 is provided with opening 43, and/or flow restrictor 48 is provided with opening 50, some of the water in the main flow path will flow directly from the inlet 16 to the outlet 18. However, the majority of the water will flow from the inlet 16 to the secondary chamber 22 and then to the outlet 18.

If the amount of overlap between openings 70 and 74, and the consequent similar overlap between openings 72 and 76 is set by rotating arm 62 in a direction tending toward minimizing the amount of overlap, limit stop 78 is rotated in a direction away from the limit stop 46. Hence, the water pressure may rotate the flow restrictor 48 toward its maximum position wherein it is aligned with the outlet 18. In order for the flow restrictor 48 to be able to move to its maximum position, the valve member 54 must be rotated to a position wherein there is minimum overlap of the openings 70, 74 which permit the water to flow into the secondary chamber 22.

If the water pressure drops due to clogging of the filter or for any other reason, the flow restrictor 48 rotates in a clockwise direction in FIG. 7 toward the limit stop 46 under the influence of spring 52 whereby the rate of water flow through the secondary chamber 22 is increased. As the arm 62 is rotated in a counterclockwise direction in FIG. 1 toward the outlet 18, valve member 54 reaches a position wherein there is no flow into the secondary chamber 22. When this occurs, flow between inlet 16 and outlet 18 is controlled solely by restrictor 48 which may rotate through its entire range of movement. When valve member 54 is fully open, the range of movement of restrictor 48 as defined by limit stops 46 and 78 is at a minimum.

Thus, it will be seen that water flowing through the apparatus 10 divides into parallel flow paths which combine for discharging from the apparatus 10 by way of outlet 18. An ingredient has been added to one of the flow paths, namely the flow path through canister 26 and chamber 22. If it is desired to neutralize the pH of the water discharging by way of outlet 18, the adapter 92 is utilized. Some of the main stream flowing through adapter 92 will flow through inlet 98, through container 96 where it mixes with a base, and discharges by way of outlet 100.

Thus, it will be noted that the rate of flow through the secondary chamber 22 is correlated with the flow through the main chamber 14. As the pressure of the water drops, more water is directed through the secondary chamber 22 so as to maintain the predetermined desired ratio of the ingredient 36 to be added. In addition, if the flow is shut off completely, the concentrated water in the outlet portion of the secondary chamber 22 is permitted to be drained to the exterior of the apparatus 10 rather than being discharged into the outlet 18. When the ingredient 36 has been totally consumed, arm 62 is rotated counterclockwise in FIG. 5 so that valve member 54 is rotated in a counterclockwise direction in FIG. 5 to shut off flow to chamber 22. Then canister 26 is unthreaded from the housing 12 and discarded. A new canister is then substituted. The apparatus 10, except for substituting a new canister, is completely automatic and any preset rate of flow through the secondary chamber 22 will resume if and when the flow resumes.

If desired, the housing 12 may be provided with a permanent refillable canister. When the ingredient 36 is exhausted, a lid may be opened and more of ingredient 36 added as needed.

While this invention is particularly adapted for adding chlorine to water recirculated from a swimming pool, it has a variety of other uses. For example, the invention may be used to add a rust inhibitor to water circulating with respect to a boiler, injection mold equipment, or other industrial equipment. Thus, this invention may be used where one chemical is to be mixed with a moving liquid stream in a controlled manner.

Thus, it will be noted that the apparatus 10 is automatic, simple, reliable, and requires little or no maintenance. The structural interrelationship of components as described above and illustrated in the drawings facilitates rapid installation as an entity.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a housing means having primary and secondary flow paths communicating with an inlet and an outlet, said housing means including selectively adjustable valve means for controlling flow between said flow paths, a movable flow restrictor in said primary flow path, and means on said housing for automatically correlating the range of movement of said flow restrictor with said valve means so that the range of movement of said flow restrictor is at a minimum when said valve means is fully opened and vice versa, a fixed limit stop on said housing means, spring means biasing said flow restrictor towards said limit stop so that there is minimum flow through the primary flow path, and another limit stop on a movable portion of said valve means for defining the range of movement of said flow restrictor.

2. Apparatus in accordance with claim 1 wherein said secondary flow path includes a chamber in said housing means for removably receiving a container of material to be added to that portion of a stream adapted to flow through said secondary flow path, a partition extending transversely across said chamber for dividing the chamber into an inlet portion and an outlet portion.

3. Apparatus in accordance with claim 2 including a container, structure on said housing means for removably securing the container in said chamber with a bottom wall of the container abutting said partition, means on the container temporarily blocking holes in the container on opposite sides of the partition so that a portion of the secondary flow path will be through the container by way of container inlet holes on one side of the partition and container exit holes on the other side of the partition.

4. Apparatus in accordance with claim 1, including drain valve means on said housing means for draining at least one of said flow paths when flow is shut off, said drain valve means including a valve member biased to a closed position by line pressure and movable to an open position when water is present at little or no pressure.

5. Apparatus in accordance with claim 4 wherein said valve member of said drain valve means has a specific gravity less than 1.

6. Apparatus in accordance with claim 1 including means for adding a chemical salt to said secondary flow path, and means for adding a pH corrective chemical to the flow stream down the stream from said outlet.

7. Apparatus in accordance with claim 1 wherein said flow restrictor is supported by said housing means in said primary flow path for rotation about an axis perpendicular to the direction of flow in the primary flow path.

8. Apparatus in accordance with claim 7 wherein said valve means includes a disc valve member rotatable about said axis.

9. Apparatus in accordance with claim 1 wherein said housing means includes a chamber for said secondary flow path, said chamber being open at one end thereof for removably receiving a container of a chemical to be added to the secondary flow path.

10. Apparatus in accordance with claim 1 including the transverse partition dividing said secondary flow path into an inlet portion and an outlet portion, said valve means including a single movable valve member for simultaneously controlling flow from said primary path to said inlet portion and for controlling flow from said outlet portion to said primary path, and a container having holes in a lower end thereof for forming a portion of said secondary flow path between said inlet portion and said outlet portion, said container having a material therein to be added to the secondary flow path.

11. Apparatus comprising a housing having a main flow chamber communicating with an inlet and an outlet, said housing having a secondary flow chamber, valve means including a single valve member positioned for controlling flow from the inlet end of said main chamber into the secondary chamber and from said secondary chamber to the outlet end of said main chamber, a movable flow restrictor in said main chamber intermediate the locations where said chambers communicate with each other, first and second limit stops in said main chamber defining the range of movement for said flow restrictor, said first limit stop being fixed and said second limit stop being movable, the location of said second limit stop being defined by the position of said valve member, means defining a constantly open bleed passage between said inlet and outlet, and spring means biasing said flow restrictor towards said first limit stop.

12. Apparatus in accordance with claim 11 wherein said secondary flow chamber is circular in configuration and open at one end, a partition at the other end of said secondary flow chamber, said partition lying along a chord of said secondary flow chamber, and the height of the partition being less than the height of said secondary flow chamber.

13. Apparatus comprising a housing means having a main flow chamber communicating with an inlet and an outlet, said housing means having a secondary flow chamber, means including a transverse partition for dividing said secondary chamber into an inlet portion and an outlet portion, valve means including a valve member having first and second flow ports in substantially the same plane and arranged with mating ports on said housing for controlling flow between said chambers so that the flow from the inlet end of said main chamber may flow through the first port into the secondary chamber inlet portion and return from said secondary chamber outlet portion through the second port to the outlet end of said main chamber, means for adding an additive to the flow in said secondary flow chamber, drain valve means on said housing means for draining at least one of said flow chambers when flow is shut off so that concentrate of the additive may not flow from the secondary chamber to said outlet, said drain valve means including a ball valve member cooperating with a valve seat so that a portion of the ball valve member is exposed at atmospheric pressure when the ball valve member is seated on said seat, said ball valve member being biased to a closed position by line pressure greater than the buoyancy force of said ball valve member, and said ball valve member being movable to an open position with respect to said seat when flow in said main chamber is at little or no pressure.

14. Apparatus in accordance with claim 13 including a rotatably mounted flow restrictor in said main chamber between said inlet and outlet, said valve member being mounted for rotation about the same axis as said flow restrictor, an external actuator connected to said valve member for rotating said valve member, said flow restrictor being biased to a minimum flow position, a movable limit stop for defining the maximum open position for said flow restrictor, said movable limit stop being coupled to said actuator for movement in response to movement of said actuator.

15. Apparatus comprising a housing having a main flow chamber communicating with an inlet and an outlet, said main chamber having a flow restrictor therein which is incapable of stopping all flow from the inlet to the outlet, means defining a secondary chamber, a transverse partition in said secondary chamber adjacent the bottom thereof, said partition having a height which is less than the height of the secondary chamber, said partition dividing said secondary chamber into an inlet portion and an outlet portion, a valve means positioned for controlling flow from that portion of said main chamber between said inlet and said restrictor to the inlet portion of said secondary chamber, said valve means also controlling flow from the outlet portion of said secondary chamber to said main chamber at a location between said restrictor and said outlet, said valve means including juxtaposed surfaces, each of said surfaces having a pair of spaced openings, said partition being located in a plane disposed between said openings in one of said surfaces, each opening being adopted for cooperation with a mating opening to control flow, said one surface being stationary with respect to said housing, said other surface being mounted for rotation about an axis generally perpendicular to the longitudinal axis of said main chamber, and a container for containing material to be introduced to the flow between said inlet and outlet, said container supported by said partition and containing means for permitting flow from said inlet portion of said secondary chamber through said container to said outlet portion of said secondary chamber.

16. Apparatus in accordance with claim 15 wherein said one surface is a wall of said main chamber, and the openings in each of said surfaces being arcuate at substantially the same radius from said axis of rotation.

17. Apparatus in accordance with claim 15 including valve means for draining said secondary chamber through said main chamber.

18. Apparatus in accordance with claim 16 wherein said flow restrictor is rotatably mounted in said main chamber for rotation about an axis parallel to said axis of rotation, said rotatably mounted flow restrictor being biased to a minimum flow position, a movable limit stop for defining the maximum open position for said movable flow restrictor, said movable limit stop being coupled to an actuator for said valve member for movement with said valve member.

* * * * *